Aug. 7, 1973  W. E. KEITH  3,751,335

NUCLEAR REACTOR FUEL ELEMENT SPACER ASSEMBLY

Filed June 1, 1970  2 Sheets-Sheet 1

INVENTOR.
W. KEITH EGGERT
BY
D. Gordon Angus
ATTORNEY.

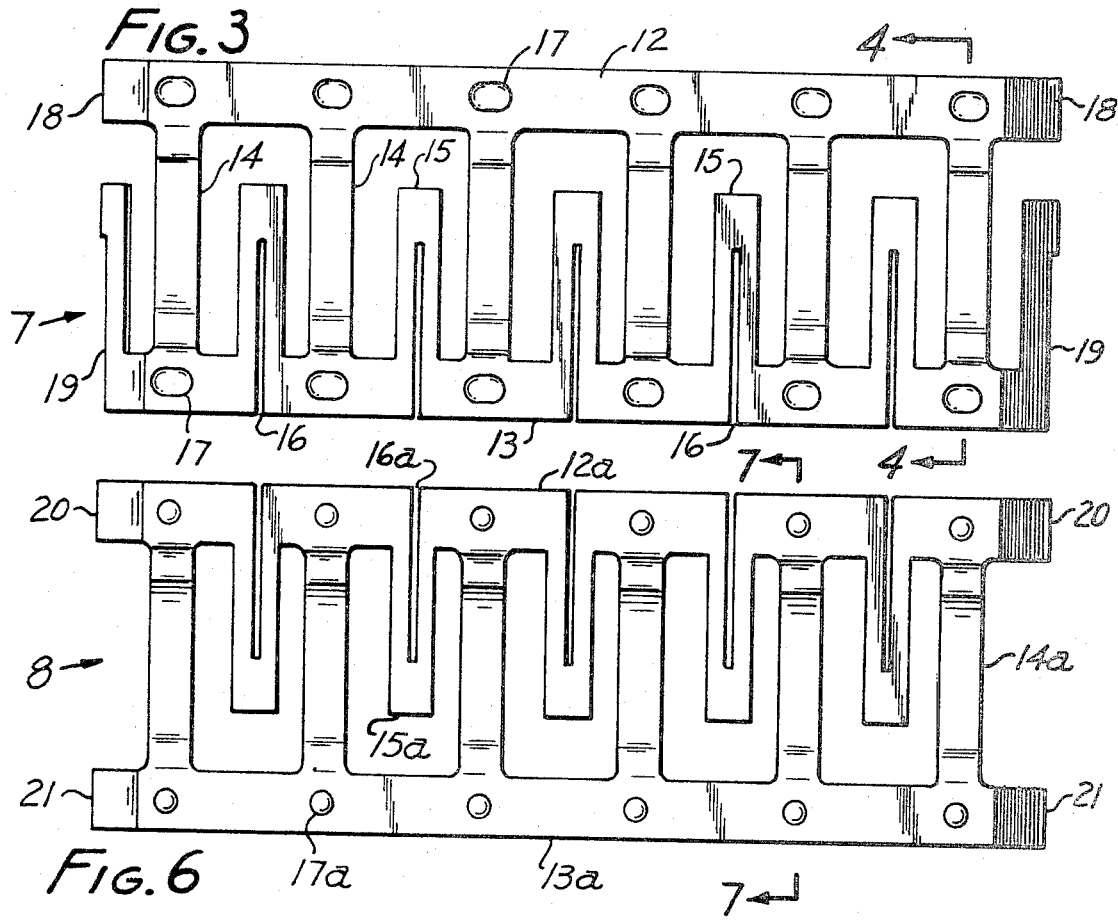
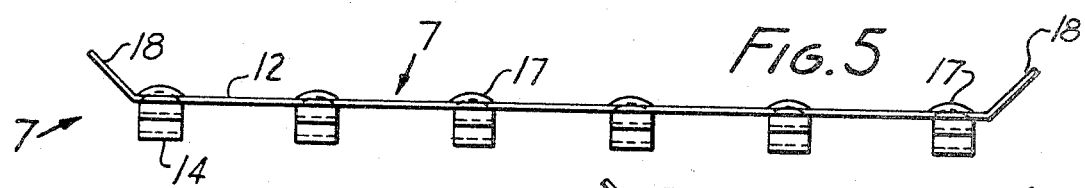
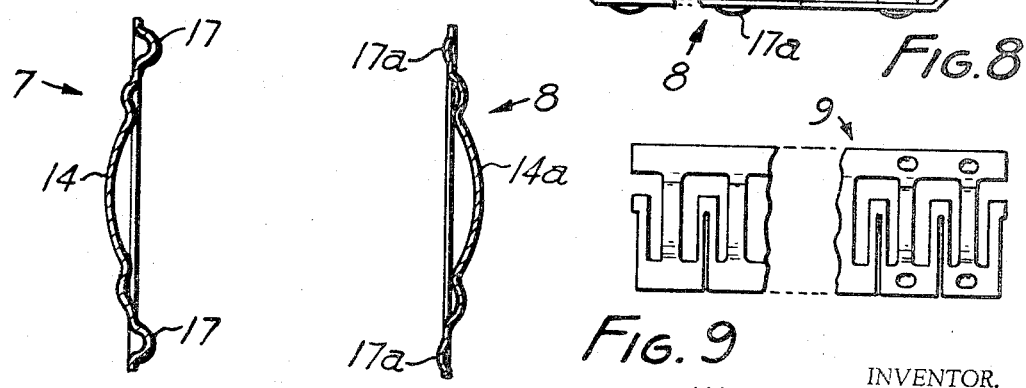

United States Patent Office 3,751,335
Patented Aug. 7, 1973

3,751,335
NUCLEAR REACTOR FUEL ELEMENT SPACER ASSEMBLY
W. Keith Eggert, Concord, Calif., assignor to Continental Oil Company, Ponca City, Okla.
Filed June 1, 1970, Ser. No. 41,966
Int. Cl. G21c 3/34
U.S. Cl. 176—78     5 Claims

ABSTRACT OF THE DISCLOSURE

A nuclear reactor fuel element spacer arrangement has a fuel element supporting and spacing means in the form of individual cells through which respective fuel rods extend. The cells have a number of sides, some of which are provided with leaf spring members protruding into the cell and others of which are provided with knobs such that the fuel rod in each cell is resiliently gripped between the springs and the knobs in a manner to restrict lateral motion of the fuel rods.

---

This invention relates to nuclear fuel assemblies of the type comprising a bundle of elongated fuel elements, and more particularly to means for supporting and spacing the fuel elements in an assembly.

An object of the invention is to provide effective restriction of lateral motion of the fuel rods held in an assembly of such rods.

Other objects are to preserve the integrity of the fuel elements and to facilitate the assembly and the flow of coolant through the assembly.

An assembly of fuel rods commonly used heretofore has involved arranging a number of fuel rods containing fissionable material in a parallel array and confined within an area, for example a square cross-sectional area, for the assembly. Provision has been made for coolant to flow past the spaced fuel rods within the space between rods and parallel to the axes of the rods so that the heat generated by the fissionable material in the rods is transferred to the coolant for such utilization as may be desired. The bundle of rods is ordinarily held at its opposite ends, and since the fuel rods have a degree of flexibility which would permit lateral motion at positions between the ends, it has been common to maintain the spacing pitch between rods and to restrict the lateral motion of the rods at positions between their ends while providing freedom for each rod to move axially under thermal expansion.

It is well known that restriction of lateral motion of the fuel rods is necessary to avoid undersirable effects such as neutron peaking and flow channeling which can cause hot spots to develop on the rods. A further reason for desiring lateral restriction is to dampen vibrations that can lead to undesired fretting of the fuel rods.

For the purpose of maintaining the fuel rods in their appointed positions and spacings in the assembly and for restriction of the lateral motion, grid-like spacers for the rods have heretofore been provided.

Grid spacers heretofore generally in use for the purpose of restricting the lateral motion of the fuel rods have utilized a grid of sheet metal in what may be called an egg-crate arrangement and provided with some form of spring fingers to grip the rods.

In accordance with the present invention there is provided a grid spacer design involving a minimum of structural mass as compared with prior designs, thereby permitting ready flow of coolant. Use of the present invention, furthermore, facilitates assembly of the spacer arrangement.

The invention is carried out by use of plates having upper and lower strips which extend horizontally, assuming the fuel rods to be situated vertically, and having leaf spring elements and tabs which extend generally vertically between the upper and lower strips of the plate. Such plates form the sides of the spacer structure the space within which is formed into a number of cells, open at the top and bottom, by use of other plates. The leaf spring elements extend between the upper and lower strips of the plates, and the tabs, located between adjacent springs, extend from one of the strips toward, but not reaching, the other strip of a plate. The tabs are provided with slots wide enough to accommodate the thickness of a plate and extending through the strip of the plate on which the tab is formed but not extending to the end of the tab.

In forming the cells of the grid-like spacer a number of the plates are placed parallel to each other extending between two opposite side plates and another set of parallel plates are placed at an angle, normally perpendicular, to the first mentioned plates. At the place where the plates cross each other one of the crossing plates is fitted within the slot of the other. According to a preferred feature, where the plates extending inside and across the area meet the side plates, an inside plate is fitted within the slot of a side plate. The structure can be held rigid by fastening at the corners as by welding or brazing.

An advantage of this structure resides in the fact that the leaf springs can be formed without stretching the material of the spring other than in simple bending, since the material gathered in forming the spring results from the change in height of the grid plates rather than from stretching of metal to form the spring. This provides a more stable spring which is essentially free of stress.

A feature of the arrangement is that the grid plates are formed with dimples or knobs which protrude from the sides of the plates.

According to another feature, the protruding springs in each of the parallel sets of plates are caused to protrude in the same direction, and also the dimples in each of the parallel plates of a set are caused to protrude in one direction. By this arrangement there is provided the feature that each of the cells of the grid spacer is provided with a leaf spring which is directed toward a protruding knob arrangement.

In the preferred arrangement, the sides of the enclosure are formed in a square and each of the cells is in a shape of a square with two adjacent sides provided with leaf springs and the other two adjacent sides provided with dimples.

The foregoing and other features of the invention will be better understood from the following detailed description and the accompanying drawings of which:

FIG. 3 is a side view of a plate used in the assembly of FIG. 1;

FIG. 4 is a cross-section taken at line 4—4 of FIG. 3;

FIG. 5 is a top view of the detail of FIG. 3;

FIG. 6 is a side view of another plate used in the assembly of FIG. 1;

FIG. 7 is a cross-section view taken at line 7—7 of FIG. 6;

FIG. 8 is a foreshortened top view of the plate of FIG. 6; and

FIG. 9 is a side view of another plate used in the assembly of FIG. 1.

Figure 1:
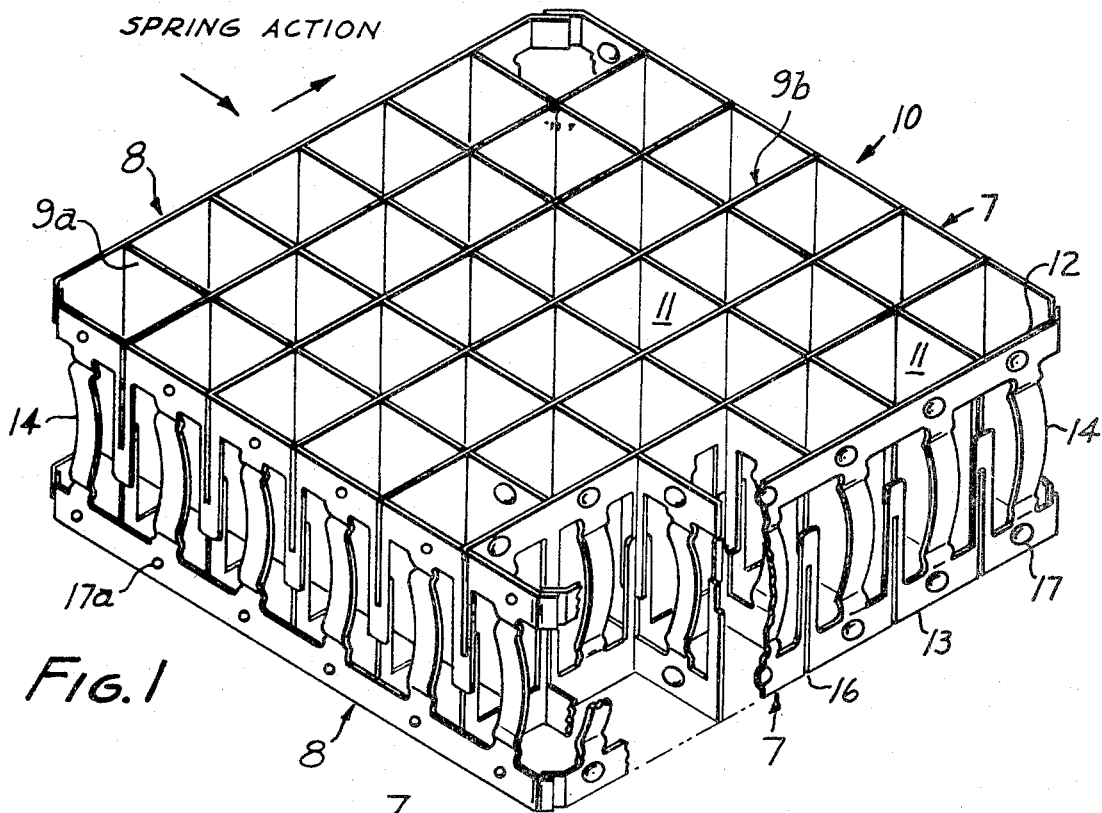
FIG. 1 is an isometric view of a nuclear fuel rod spacer assembly according to this invention.
Figure 2:
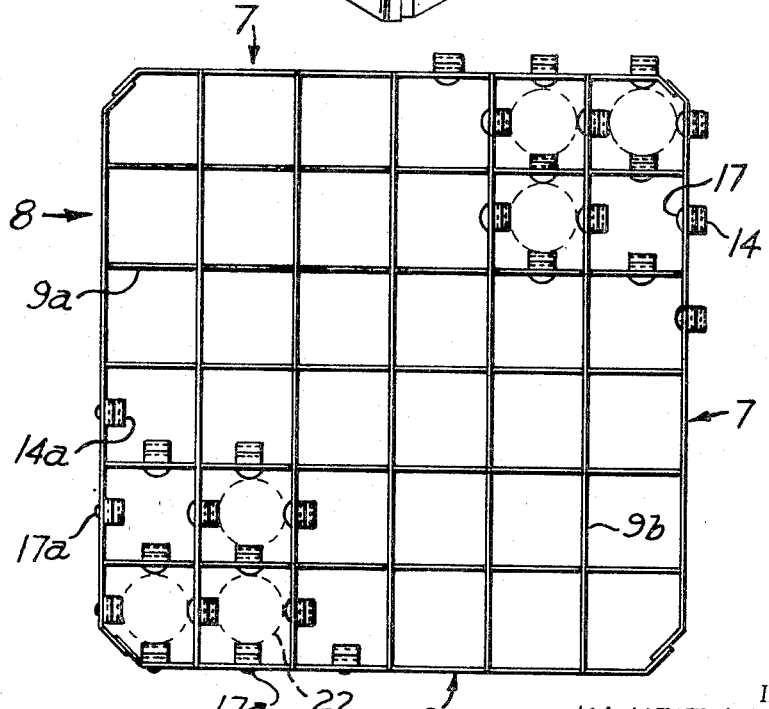
FIG. 2 is a top view of the spacer of FIG. 1.

Referring to the drawings, FIGS. 1 and 2 show a nuclear fuel rod spacer assembly for supporting nuclear fuel rods, ordinarily in a vertically extending position, in an array within an area bounded by the outer sides of a grid structure 10, the outer sides forming an enclosure having a substantially square shape. Within these four sides defining the enclosure, there are formed a number of grid cells 11 of square cross-section, there being shown six such cells along each side, although it will be understood that some other number of cells could be used. The parts forming this grid structure are made up of structural plates 7, 8 and 9 shown in FIGS. 3, 6 and 9, respectively, which are assembled to form the grid assembly.

The structural plate 7 shown in FIGS. 3, 4 and 5 comprises a continuous upper strip 12 and a lower strip 13 parallel to the upper strip, the upper and lower strips being joined by a number of vertically extending leaf-spring members 14 which protrude from one side of the strips but are attached at their ends to these strips. Midway between each of the leaf-spring members 14 there is formed a tab member 15 extending upwardly from the lower strip 13 for a distance short of reaching the upper strip 12. Each of these tab members is formed with a vertically extending slot 16 extending from the bottom of the lower strip 12 to a position halfway up to the top of the upper strip 12. The slots 16 are of sufficient width to accommodate the thickness of an intersecting plate. Each of the strips 12 and 13 has formed in it a number of dimples or knobs 17, all formed in the same direction, at positions above and below the spring members 14, and the dimples protrude from strips 12 and 13 in the opposite direction from the protrusion of the spring members 14.

The plate 7 has its upper ends 18 and also its lower ends 19 bent obliquely from the plane of strips 12 and 13 in the direction away from the protruding springs 14, as shown in FIG. 5.

The structural plate 8 shown in FIGS. 6, 7 and 8 has substantially the same dimensions as the plate 7, the principal difference being some reversals of parts. Thus, its lower strip 13a is continuous like the strip 12 of FIG. 3 and the upper strip 12a instead of being continuous is provided with slots 16a extending downwardly from the top half-way to the bottom of the lower strip 13a, through the downwardly depending tabs 15a. The leaf-springs 14a are like the leaf-springs 14 of FIG. 3 except that the springs 14a protrude from the opposite side of the structural member from the protrusion of spring 14. The upper ends 20 and lower ends 21 of plate 8 are bent obliquely to the strip but toward the protruding spring 14a instead of away from it. The dimples 17a protruding at the opposite side of the plate from spring 14a are somewhat smaller in height than the dimples 17 of plate 7. The positioning of the springs, the tabs and the slots correspond with the positioning of the corresponding parts of plate 7 except for the reversals noted above.

The sides of the square are formed by joining the oblique ends of two of the structural plates 7 and two of the structural plates 8 of the corners of the square as shown in FIGS. 1 and 2, the plates 7 being adjacent to each other and the plates 8 being adjacent to each other. The cells are formed within the square by use of the proper number of structural plates 9, shown in FIG. 9. Plates 9 are identical with plates 7 except that the ends 18 and 19 are not bent obliquely from the plane of the plate as shown in FIG. 3; and instead, these ends are in the same plane as the rest of the structural plate as shown in FIG. 9.

In assembling the grid structure, the two plates 7 are attached together at their oblique ends and the two plates 8 are likewise attached together at their oblique ends, the remaining ends of the plates 7 and 8 being attached together, to complete the sides of the square. The proper number of plates 9 will then be used to complete the cellular structure within the square. Since there are six cells to a side there will be needed a set of five of the plates 9 extending parallel to each other between two opposite sides of the square and an additional set of five plates 9 extending parallel to each other between the other two opposite sides of the square. The five parallel plates 9 of one of these sets are placed with their slots depending downwardly from the top, these plates being designated as 9a in FIGS. 1 and 2. The other set of five parallel plates 9 extending perpendicular thereto have their slots extending up from the bottom, these plates being referred to as 9b in FIGS. 1 and 2. The arrangement is such that the continuous strips 12 of plates 9 fit within the ends of the slots of the plates 9 which they cross, and ends of plates 9a and 9b fit within the respective slots of side plates 7 and 8. The assembly is secured to form a rigid structure by suitably welding or brazing the grid cell corners and the corners of the plates forming sides of the square. This will also serve to seal the corners to prevent crevice corrosion.

By this arrangement all of the leaf springs of plates 9a protrude in one direction into the cells of the grid and all of the leaf springs of the other members 9b likewise all protrude in the same direction into their cells, but different from the direction of the springs of plates 9a, thereby giving spring actions in the directions of the two arrows labeled "spring-action." The arrangement also provides that the dimples 17 will all protrude into their respective cells in the directions opposite the protrusions of the springs. Hence, two adjacent sides of each square cell will have protruding springs and the other two adjacent sides of each cell will have protruding dimples 17.

The dimensions of the cells and the positions of the springs and dimples are such that each cell can be provided with a fuel rod 22 substantially centered within its cell and extending through the cell in a vertical direction. The relative dimensions of the fuel rods and the parts of the cell are such that the two springs protruding into each cell will exert an effective spring action against the side of the rod, urging the rod against the dimples on the two other sides of the cell, thereby centering the rod in the cell.

The springs and the small dimples 17a which protrude outwardly from the sides of the assembly will serve to position this assembly by contact with other adjacent assemblies in a system.

Ordinarily there will be more than one of the grid spacers located vertically apart from each other in a nuclear fuel rod assembly, the number of the grid spacers depending upon the length of the fuel rods.

A suitable material for the grid plates is Inconel. After the brazing operation, the grid will ordinarily be age-hardened to obtain the spring property. Since the leaf springs are fixed at both ends, insurance is provided against a clogging of this part in a fuel assembly or reactor in the event of a breakage of a spring. The provision of dimples at both ends of the leaf spring serve to maintain a perpendicularity of the fuel rods with the mid-plane of the support grid.

It will be recognized that by the present invention there is provided a fuel tube spacer grid which is relatively simple to assemble from the plates and which is capable of firmly supporting the fuel tubes against lateral movement, thereby avoiding undesirable effects of any vibration which if present could cause fretting. It will also be recognized that the grid structure according to the present invention presents a minimum of metallic mass, hence affording freedom of coolant flow and without substantial absorption of neutrons.

It will furthermore be noted that the spring members, being fastened at each end, have greater reliability than in the case of other designs having springs fastened at one end only. The arrangement according to the present invention, furthermore, has the manufacturing advantage that all parts can be made with very similar progressive dies.

What is claimed is:

1. Spacing means for a nuclear reactor fuel assembly comprising a plurality of plates within an enclosed area, a first group of said plates extending in one direction parallel to and spaced from, each other, and a second group of said plates extending in another direction parallel to and spaced from, each other, thereby forming cells within the area, each of said plates comprising an upper horizontal strip and a lower horizontal strip which is separated from the upper strip, one of said strips being continuous and the other strip being discontinuous, spaced leaf-springs joining the upper and lower strips and protruding from one side of the plate, the discontinuous strip carrying spaced tabs located between the leaf-springs and extending toward and approaching, the continuous strip, said spaced tabs having slots which extend through it to render it discontinuous and each slot extending part way toward the end of a respective tab, the plates extending in the different directions intersecting each other with the spaced tab slot of the discontinuous strip of one plate passing through the spaced tab slot of another discontinuous strip.

2. Spacing means according to claim 1 in which the leaf-springs protrude from the respective plates of their parallel group in the same direction.

3. Spacing means according to claim 2 in which the plates of each parallel group are provided with knobs which protrude from the respective plates in the direction opposite the protrusion of the springs.

4. Spacing means according to claim 1 in which the enclosed area is four-sided with the two pairs of opposite sides parallel to each other and the four sides are formed by side plates which receive the ends of respective plates of said first and second groups of plates.

5. Spacing means according to claim 4 in which the plates are age-hardened to enhance the spring action of the leaf-springs.

References Cited
UNITED STATES PATENTS

| | | | |
|---|---|---|---|
| 3,350,275 | 10/1967 | Venier et al. | 176—78 |
| 3,379,617 | 4/1968 | Andrews et al. | 176—78 |
| 3,442,763 | 5/1969 | Chetter et al. | 176—78 |
| 3,423,287 | 1/1969 | Anthony et al. | 176—78 |
| 3,510,397 | 5/1970 | Zettervall | 176—78 |
| 3,380,890 | 4/1968 | Glandin et al | 176—78 |
| 3,398,053 | 8/1968 | Huber et al. | 176—78 |
| 3,255,091 | 6/1966 | Frisch | 176—78 |

CARL D. QUARFORTH, Primary Examiner

GARY G. SOLYST, Assistant Examiner

U.S. Cl. X.R.

176—76